United States Patent
Jo et al.

(10) Patent No.: US 11,712,634 B2
(45) Date of Patent: Aug. 1, 2023

(54) METHOD AND APPARATUS FOR PROVIDING ONLINE SHOOTING GAME

(71) Applicant: GREE, INC., Tokyo (JP)

(72) Inventors: Chang Hyun Jo, Seoul (KR); Ki Hoon Lee, Seoul (KR); Jung Ho Lee, Seoul (KR); Sae Rom Kim, Seoul (KR)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/453,955

(22) Filed: Nov. 8, 2021

(65) Prior Publication Data

US 2022/0054947 A1  Feb. 24, 2022

Related U.S. Application Data

(63) Continuation of application No. 16/773,913, filed on Jan. 27, 2020, now Pat. No. 11,192,035, which is a
(Continued)

(51) Int. Cl.
*A63F 13/837* (2014.01)
*A63F 13/30* (2014.01)
*A63F 13/35* (2014.01)

(52) U.S. Cl.
CPC ............ *A63F 13/837* (2014.09); *A63F 13/30* (2014.09); *A63F 13/35* (2014.09)

(58) Field of Classification Search
CPC ......... A63F 13/837; A63F 13/30; A63F 13/35
See application file for complete search history.

(56) References Cited

U.S. PATENT DOCUMENTS 6,652,384 B2   11/2003  Kondo
8,210,943 B1 *  7/2012  Woodard ................ A63F 13/69
                                                                463/2
(Continued)

FOREIGN PATENT DOCUMENTS

JP      7-275507      10/1995
JP      8-229238       9/1996
(Continued)

OTHER PUBLICATIONS

"Call of Duty: Black Ops 2 Gameplay"—Extended Footage Mission 1—COD BO2 Official E3 2012 HD. Youtube.com. Online. Jun. 5, 2012. Accessed via the Internet. Accessed Oct. 22, 2022. <URL: https://www.youtube.com/watch?v=pTtsn2Srm3E> (Year: 2012).*
(Continued)

*Primary Examiner* — Thomas J Hong
*Assistant Examiner* — Carl V Larsen
(74) *Attorney, Agent, or Firm* — Oblon, McClelland, Maier & Neustadt, L.L.P.

(57) ABSTRACT

The present disclosure relates to providing an online shooting game by a game server communicatively connected to a player terminal. The player terminal may display a virtual online shooting game environment based on information received from the game server. Providing an online shooting game may include: selecting a basic identification range within a virtual online shooting game environment displayed on the player terminal; detecting one or more enemy characters that are within the basic identification range; determining one of the detected one or more enemy characters as an automatic tracking object; and allowing an aiming point to automatically track movement of the automatic tracking object within the basic identification range.

17 Claims, 7 Drawing Sheets

Related U.S. Application Data continuation of application No. 15/700,285, filed on Sep. 11, 2017, now Pat. No. 10,589,180, which is a continuation of application No. 14/355,166, filed as application No. PCT/KR2013/002844 on Apr. 5, 2013, now Pat. No. 9,770,664.

(56) References Cited

U.S. PATENT DOCUMENTS

| | | | |
|---|---|---|---|
| 9,770,664 | B2 | 9/2017 | Jo |
| 10,589,180 | B2* | 3/2020 | Jo ............................ A63F 13/30 |
| 2002/0103031 | A1 | 8/2002 | Neveu |
| 2002/0173358 | A1 | 11/2002 | Yoshida |
| 2004/0063501 | A1 | 4/2004 | Shimokawa |
| 2004/0110560 | A1* | 6/2004 | Aonuma ................. A63F 13/10 463/32 |
| 2004/0176163 | A1 | 9/2004 | Ishihata |
| 2006/0084509 | A1* | 4/2006 | Novak ................ A63F 13/5372 463/30 |
| 2006/0223635 | A1 | 10/2006 | Rosenberg |
| 2007/0049313 | A1 | 3/2007 | Grams |
| 2008/0188302 | A1 | 8/2008 | Haga |
| 2009/0163274 | A1 | 6/2009 | Kando |
| 2009/0181736 | A1 | 7/2009 | Haigh-Hutchinson |
| 2009/0313584 | A1 | 12/2009 | Kerr |
| 2010/0009733 | A1* | 1/2010 | Garvin .................. A63F 13/837 463/37 |
| 2010/0069152 | A1* | 3/2010 | Nishimura .............. A63F 13/10 463/31 |
| 2010/0273544 | A1 | 10/2010 | Koganezawa |
| 2011/0199325 | A1 | 8/2011 | Payne |
| 2012/0110494 | A1 | 5/2012 | Jun |
| 2014/0066197 | A1* | 3/2014 | Cousins ................ A63F 13/219 463/31 |
| 2015/0157940 | A1* | 6/2015 | Hall ...................... A63F 13/533 463/31 |
| 2021/0274661 | A1 | 9/2021 | Zhang et al. |

FOREIGN PATENT DOCUMENTS

| | | |
|---|---|---|
| JP | 11-259686 | 9/1999 |
| JP | 2001-46743 A | 2/2001 |
| JP | 2003-19355 | 1/2003 |
| JP | 2003-245465 | 9/2003 |
| JP | 2006-122123 | 5/2006 |
| JP | 2007-312930 | 12/2007 |
| JP | 2010-124874 A | 6/2010 |
| JP | 2010-213846 | 9/2010 |
| JP | 2011-215886 A | 10/2011 |
| JP | 2012-210243 | 11/2012 |
| JP | 2012-236095 A | 12/2012 |
| KR | 10-2013-0027621 | 3/2013 |
| WO | WO 2021/114118 A1 | 8/2012 |

OTHER PUBLICATIONS

FixBlops2. Aim Assist works through walls, community.callofduty. com. Online. Dec. 13, 2012. Accessed via the Internet. Accessed Aug. 8, 2016. <URL: https://community.callofduty.com/t5/Call-of-Duty-Black-Ops-II-Xbox/Aim-Assist-works-through-walls/td-p/8342368> (Year: 2012).*

Office Action dated Apr. 4, 2017 in Japanese Patent Appilcation No. 2017-032429 (with English translation).

Office action dated Nov. 8, 2016 in corresponding JP Patent Application No. 2016-161509, 5pp.

Office action dated May 24, 2018 in corresponding JP Patent Application No. 2016-060656 including English translation 6pp.

FixBlops2. Aim Assist works through walls. community.callofduty. com. Online. Dec. 13, 2012. Accessed via the Internet. Accessed Aug. 8, 2016. <URL: https://community.callofduty.com/t5/Call-of-Duty-Black-Ops-I I-Xbox/Aim-Assist-works-through-walls/td-p/8342368>.

"Call of Duty: Black Ops 2 Gameplay"—Extended Footage Mission 1—COD B02 Official E3 2012 HD. Youtube.com. Online. Jun. 5, 2012. Accessed via the Internet. Accessed Aug. 8, 2016 <URL: https://www.youtube.com/watch?v=pTtsn2Srm3E>.

Office action issued in corresponding Japanese Patent Application No. 2015-510174, dated Jul. 7, 2015, including English translation, 7pp.

International Search Report and Written Opinion corresponding PCT/KR2013/002844; dated Jan. 7, 2014, 10 pages.

Office Action dated Jun. 29, 2021 in Japanese Patent Application No. 2019-224472, with concise English translation.

Japanese Office Action dated Jan. 5, 2021 in Japanese Patent Application No. 2019-224472 (with unedited computer generated English translation), 5 pages.

Petition for Post-Grant Review of U.S. Pat. No. 9,770,656 dated Jun. 22, 2018.

Petition for Post-Grant Review of U.S. Pat. No. 9,770,664 dated Jun. 22, 2018.

Difference between difficulty settings?. Deus Ex: Human Revolution—Message Board. www.gamefags.com. Online. 2011. Accessed via the Internet. Accessed Sep. 27, 2018. <URL: https://gamefaqs.gamespot.com/boards/944090-deus-ex-human-revolution/60150136>.

US Patent Trial and Appeal Board Case No. PGR2018-00070, U.S. Pat. No. 9,770,656, *Supercell Oy* v. *Gree, Inc.*, Patent Owner's Preliminary Response Pursuant to 37 CFR § 42.207(a) (86 pgs.).

US Patent Trial and Appeal Board Case No. PGR2018-00070, U.S. Pat. No. 9,770,656, *Supercell Oy* v. *Gree, Inc.*, Gree Exhibit 2001: Declaration of Michael Shamos (118 pgs.).

US Patent Trial and Appeal Board Case No. PGR2018-00070, U.S. Pat. No. 9,770,656, *Supercell Oy* v. *Gree, Inc.*, Gree Exhibit 2002: Bauckhage et al., "How Players Lose Interest in Playing a Game: An Empirical Study Based on Distributions of Total Playing Time" (8 pgs.).

US Patent Trial and Appeal Board Case No. PGR2018-00071, U.S. Pat. No. 9,776,664, *Supercell Oy* v. *Gree, Inc.*, Patent Owner's Preliminary Response Pursuant to 37 CFR § 42.207(a) (69 pgs.).

US Patent Trial and Appeal Board Case No. PGR2018-00071, U.S. Pat. No. 9,776,664, *Supercell Oy* v. *Gree, Inc.*, Gree Exhibit 2005: Vicencio-Moriera et al., "The Effectiveness (or Lack Thereof) of Aim-Assist Techniques in First-Person Shooter Games" (10 pgs.).

US Patent Trial and Appeal Board Case No. PGR2018-00071, U.S. Pat. No. 9,776,664, *Supercell Oy* v. *Gree, Inc.*, Gree Exhibit 2001: Declaration of Michael Shamos (104 pgs.).

US Patent Trial and Appeal Board Case No. PGR2018-00071, U.S. Pat. No. 9,776,664, *Supercell Oy* v. *Gree, Inc.*, Gree Exhibit 2003: Hynninen, "First-Person Shooter Controls on Touchscreen Devices: a Heuristic Evaluation of three Games on the iPod Touch" (68 pgs.).

US Patent Trial and Appeal Board Case No. PGR2018-00071, U.S. Pat. No. 9,776,654, *Supercell Oy* v. *Gree, Inc.*, Gree Exhibit 2002: Bauckhage et al., "How Players Lose Interest in Playing a Game: An Empirical Study Based on Distributions of Total Playing Time" (8 pgs.).

US Patent Trial and Appeal Board Case No. PGR2018-00071, U.S. Pat. No. 9,776,664, *Supercell Oy* v. *Gree, Inc.*, Gree Exhibit 2004: Ziaeehezarjeribi, "Learning Strategies in play During Basic Training for Medal of Hone and Call of Duty Video Games" (201 pgs.).

US Patent Trial and Appeal Board Case No. PGR2018-00071, U.S. Pat. No. 9,776,664, *Supercell Oy* v. *Gree, Inc.*, Gree Exhibit 2006: Statutory Disclaimer of Claims 16-19 of U.S. Pat. No. 9,770,664 (14 pgs.).

Office Action dated Oct. 9, 2018 in Japanese Patent Application No. 2017-188030, with English translation.

"Metal gear rising revengeance", Dengeki PlayStation, ASCII Media Works, Feb. 14, 2013; vol. 19, No. 6, pp. 3-4, with machine English translation.

U.S. Patent Trial and Appeal Board Case PGR2018-00071, U.S. Pat. No. 9,770,664 B2, *Supercell Oy* v. *Gree, Inc.*, Decision Denying Institution of Post-Grant Review 35 U.S.C. §324(a) entered Jan. 23, 2019, 8 pp.

Office Action dated May 7, 2019, in corresponding Japanese Patent Application No. 2017-188030 (with English-language translation), reference AO cited therein.

(56) References Cited

OTHER PUBLICATIONS

Office Action dated May 9, 2023 in Japanese Patent Application No. 2022-073300, with English translation.

Try to defeat Ark Hydra with Dragon's Dogma Magic Archer, YouTube [online] [video], Aug. 9, 2012, https://www.youtube.com/watch?v=eNYgM2Dcvl.

Remote control operation is super fun! Various attractive stages, 3D action shooter "Sin and Punishment Successor of the Universe" that can be played even by stoic players, introduce the game and see what's inside! [online] May 25, 2012. blog.livedoor.jp/xxxplus/archives/53651167.html.

* cited by examiner

METHOD AND APPARATUS FOR PROVIDING ONLINE SHOOTING GAME

CROSS-REFERENCE TO RELATED APPLICATIONS

The present application is a continuation application of U.S. patent application Ser. No. 16/773,913, filed Jan. 27, 2020 (the entire disclosure of which is incorporated herein by reference), which is a continuation application of U.S. patent application Ser. No. 15/700,285, filed Sep. 11, 2017, now U.S. Pat. No. 10,589,180 (the entire disclosure of which is incorporated herein by reference), which is a continuation application which claims the benefit of priority under 35 U.S.C. § 120 of U.S. patent application Ser. No. 14/355,166, filed Apr. 29, 2014, now U.S. Pat. No. 9,770,664, which, is a National Phase Application and claims priority to and the benefit of International Application No. PCT/KR2013/002844, filed on Apr. 5, 2013, the entire disclosure of which is incorporated herein by reference.

TECHNICAL FIELD

The present disclosure relates to a method, apparatus and system for providing an online shooting game.

BACKGROUND ART

With the rapid advancement of computing devices and network environments, online-based games have been increasingly spreading and developing. Online-based games have become more and more popular in that many unspecified or anonymous players at remote places can interact with one another without any spatial constraints and enjoy the games. Among these, shooting games in which players may shoot at targets in a virtual 3D space displayed on a monitor have been particularly popular due to a variety of visual and sound effects and the effect of stress reduction resulting from hitting a target.

The shooting games include a third-person shooter (TPS), in which a character manipulated by a player is displayed on a screen and where the player can manipulate his/her own character while viewing the backside of the character, and a first-person shooter (FPS), in which a player's field of vision becomes a character's field of vision, and where the player makes an attack on a target from the player's point of view. In the field of games where a player controls the shooting action by correctly aiming and firing at a remote distance using a weapon such as a gun under a hypothetical war situation, the first-person shooter, which allows the player to enjoy the game with a sense of presence or immersion as if the player appears to exist in a virtual world, has been widely used.

However, in the case of these shooting games, there are problems in that a clumsy or novice junior player has more difficulty in hitting a target with a bullet than a senior player and accordingly experiences an insufficient sense of immersion and pleasure in the game. These problems are a factor that hinders a new player's participation in or persistent use of the game. In particular, recently, online battle games allowing a large number of players to participate in the games make it more difficult for junior players to adapt themselves in the games.

Therefore, there is a need to increase the convenience of shooting games depending on the skill levels of players so that experienced senior players can still achieve a sense of more tension and liveness while junior players are able to adapt themselves to the shooting games with more ease and interest.

Online-based games have been developed to also allow games to be played via touch screens having a relatively small display area, such as smartphones and smart pads, as well as desktop computers and laptop computers that have a high resolution display and a variety of input devices. However, for touch screen displays having restricted input means, there is a need for providing a method of finding a target and to aim and fire at the target with more ease.

SUMMARY

It is, therefore, an object of the present disclosure to provide a method and apparatus for finding a target and aiming at targets with ease in shooting games. It is another object of the present disclosure to provide a method and apparatus for increasing convenience for shooting games based on skill levels of the players so that experienced senior players can still achieve a sense of more tension and liveness, while junior players are able to adapt themselves to the shooting games with more ease and interest.

According to one aspect of the present disclosure, there is provided a method of providing an online shooting game by a game server communicatively connected to a player terminal, including: selecting a basic identification range within a virtual online shooting game environment displayed on the player terminal; detecting one or more enemy characters that are within the basic identification range; and determining one of the detected one or more enemy characters as an automatic tracking object.

According to one embodiment, the basic identification range is moveable within the virtual online shooting game environment in response to a manipulation input from the player terminal.

According to one embodiment, selecting the basic identification range includes selecting one of a plurality of basic identification ranges having different areas, respectively, according to a setting on the player terminal or a selection from the player terminal.

According to one embodiment, determining the one of the detected one or more enemy characters as the automatic tracking object includes determining an attack priority on each of the detected one or more enemy characters, and the attack priority is determined based on at least one of a level of expected damage capable of being inflicted on a corresponding enemy character by a shooting from the player terminal and a level of risk of the corresponding enemy character to the player terminal.

According to one embodiment, the method further includes: allowing an aiming point to track the automatic tracking object according to the movement of the automatic tracking object within the basic identification range.

According to one embodiment, the automatic tracking object is moved within the virtual online shooting game environment, and allowing the aiming point to track the automatic tracking object includes allowing the aiming point to automatically move toward the automatic tracking object according to the movement of the automatic tracking object within the basic identification range.

According to one embodiment, allowing the aiming point to track the automatic tracking object includes allowing the aiming point to automatically move toward an obstacle if the automatic tracking object is invisible on the player terminal due to an obstacle in the basic identification range as the automatic tracking object is moved within the basic identification range.

According to one embodiment, a movement trajectory of the aiming point is visible on the player terminal.

According to one embodiment, allowing the aiming point to be automatically moved toward the automatic tracking object includes changing display of the aiming point based on a location relationship between the aiming point and the automatic tracking object.

According to one embodiment, the method further includes: releasing the automatic tracking object if the automatic tracking object is moved out of the basic identification range within the virtual online shooting game environment.

According to one embodiment, the method further includes: receiving a shooting input from the player terminal; and calculating a damage to be inflicted on the automatic tracking object based on the received shooting input and reflecting the calculated damage in the online shooting game.

According to one embodiment, the method further includes: calculating loss of firepower to be applied to the player terminal based on the basic identification range and the received shooting input and reflecting the calculated loss of firepower in the online shooting game.

According to another aspect of the present disclosure, there is provided an online shooting game providing system including a player terminal, a game server communicatively connected to the player terminal, and a database connected to the game server, wherein the game server includes: a basic identification range selecting unit configured to select a basic identification range within a virtual online shooting game environment displayed on the player terminal; and a tracking object determining unit configured to detect one or more enemy characters that are within the basic identification range and determine one of the detected one or more enemy characters as an automatic tracking object.

According to another aspect of the present disclosure, there is provided a computer-readable recording medium recoding one or more instructions that, when executed by a computing system, cause the computing system to perform a method of providing an online shooting game, the method including: selecting a basic identification range within a virtual online shooting game environment displayed on a player terminal; detecting one or more enemy characters that are within the basic identification range; and determining one of the detected one or more enemy characters as an automatic tracking object.

The present disclosure can provide a user interface capable of finding and aiming at a target with ease in shooting games. In addition, the present disclosure allows experienced senior players to be able to achieve a sense of more tension and liveness, and junior players to be able to adapt themselves to the shooting games with more ease and interest, depending on skill levels of players participating in the shooting games.

DETAILED DESCRIPTION

Embodiments of the present disclosure will now be described in detail with reference to the accompanying drawings. In the following detailed description of the present disclosure, concrete description on publicly known functions or constructions will be omitted if it is deemed that the functions and/or constructions may unnecessarily obscure the gist of the present invention. Further, it should be appreciated that the following detailed description merely relates to one embodiment of the present disclosure but are not intended to limit the present disclosure.

Figure 1:
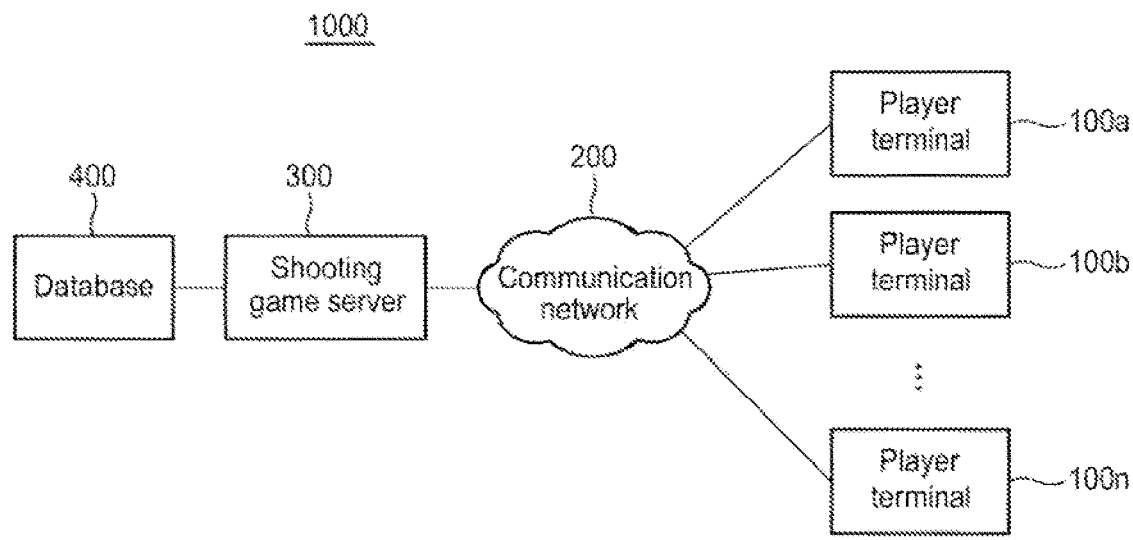
FIG. 1 is a schematic diagram showing a system for providing an online shooting game according to one embodiment of the present disclosure.

FIG. 1 is a block diagram showing a game system 1000 for providing an online shooting game according to one embodiment of the present disclosure. As shown in FIG. 1, the game system 1000 may include one or more player terminals 100a to 100n, a communication network 200, a shooting game server 300, and a database 400.

The player terminals 100a to 100n may be terminals used by players to play games. In one embodiment, the player terminals 100a to 100n may include, but are not limited to, smartphones, personal digital assistants (PDAs), tablet PCs and the like that are capable of performing mobile communications. In another embodiment, the player terminals 100a to 100n may include various devices such as desktop computers, laptop computers, workstations and the like, which are capable of performing various types of wired/wireless fixed or mobile network communications. Although FIG. 1 is shown with three player terminals, the present disclosure is not limited thereto. It is appreciated that the game system according to the present disclosure may include fewer or more player terminals.

Each of the player terminals 100a to 100n may include a display (not shown) for showing a progress of a game to a player, and a hardware/software input means (not shown) capable of being used to provide a manipulation input required for the player to play the game. In one embodiment, each of the player terminals 100a to 100n may include a virtual pad on the display as an input means. For example, the display of each of the player terminals 100a to 100n may be implemented with a touch screen, and the virtual pad may include a variety of graphical user interfaces (e.g., a direction selection button, a weapon aim and fire button, a weapon selection button, etc.) that can be touched and selected by the player on the touch screen. When playing the game, the player may perform operations such as an operation for a character movement, an operation for aiming and firing a weapon, etc. using the virtual pad on the display.

Each of the player terminals 100a to 100n may also include a game client (not shown). The game client may be a game providing means that can be run on the player terminal and may be implemented by a hardware or a software such as a program executable by computers or processors performed in the player terminals 100a to 100n, etc. The game client can establish and maintain communications with the shooting game server 300 and exchange data with the shooting game server 300 so that an online shooting game can be provided to the player terminal. In one embodiment, the game client may interwork with the shooting game server 300 to perform a part of operations required for providing the game.

Each of the player terminals 100a to 100n may establish and maintain communications with the shooting game server 300 via the communication network 200. In one embodiment, the communication network 200 may include various types of wired/wireless fixed or mobile networks. It would be appreciated by those skilled in the art that various other types of communication networks can be used to provide the online shooting game of the present disclosure.

The shooting game server 300 may, at least in part, perform data exchange in real-time with each of the player terminals 100a to 100n and the database 400 via the communication network 200. By interworking with the database 400, the shooting game server 300 may provide an authentication process for each of the player terminals 100a to 100n, an update of the game client installed in each of the player terminals 100a to 100n, game progresses, etc. Although FIG. 1 is shown with the game system 1000 including a single shooting game server 300, the present disclosure is not limited thereto. It would be appreciated by those skilled in the art that the shooting game server 300 may be configured to include a plurality of distributed servers connected thereto via the communication network 200 or other suitable types of networks, according to other embodiments of the present disclosure.

The database 400 may store a variety of information for providing the online shooting game. In one embodiment, the database 400 may include information on authentication for the respective player terminals, information on the respective characters and items associated with the game progress, information on game history of the respective players, etc. Although FIG. 1 is shown with only one database 400, the present disclosure is not limited thereto. It would be appreciated by those skilled in the art that the databases 400 may include a larger number of databases according to other embodiments of the present disclosure.

Figure 2:
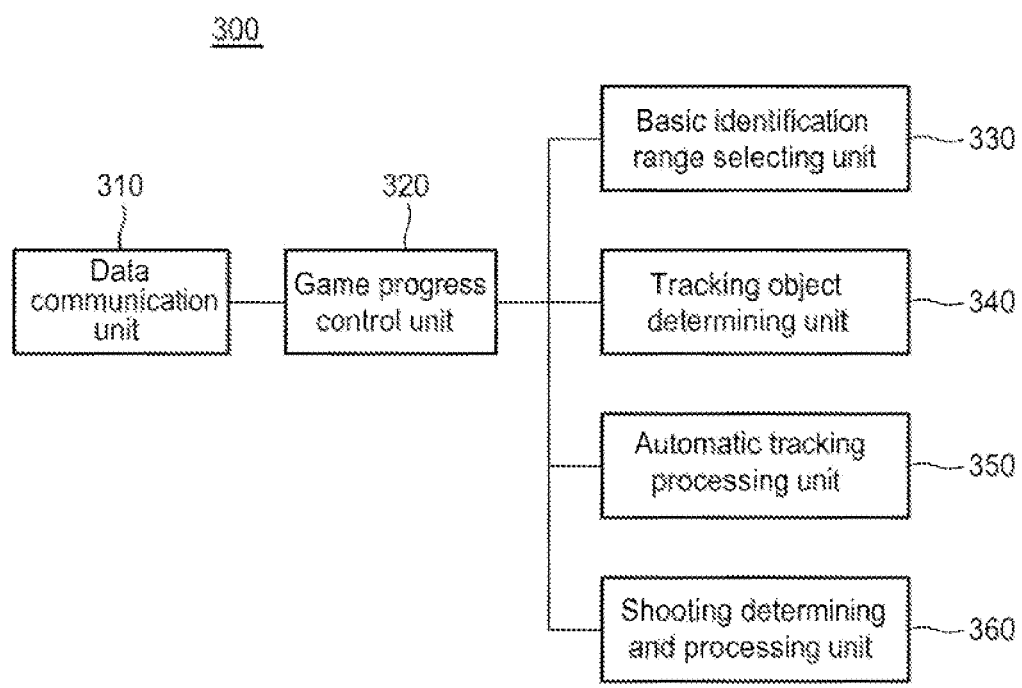
FIG. 2 is a block diagram showing an internal configuration of a shooting game server of FIG. 1.

FIG. 2 is a block diagram showing an internal configuration of the shooting game server 300 of FIG. 1. As shown, the shooting game server 300 may include a data communication unit 310, a game progress control unit 320, a basic identification range selecting unit 330, a tracking object determining unit 340, an automatic tracking processing unit 350, and a shooting determining and processing unit 360.

The data communication unit 310 may be a communication interface for facilitating exchange of data required for game progress with each of the player terminals 100a to 100n and/or the database 400 under control of the game progress control unit 320. According to one embodiment, the data communication unit 310 may receive a variety of input information on the game progress (e.g., manipulation information on movements of a basic identification range and an aim, movement of a visual field of a player character, shootings, etc. in the shooting game in progress) from each of the player terminals 100a to 100n via the communication network 200. The data communication unit 310 may also receive a variety of information on authentication for each of the player terminals 100a to 100n, the game progress, etc. from the database 400.

The game progress control unit 320 may perform authentication for each of the player terminals 100a to 100n and various controls related to the progress of the shooting game by controlling each component in the shooting game server 300. The game progress control unit 320 may control a suitable flow of various information received via the data communication unit 310 in the shooting game server 300 and deliver results of processing by the shooting game server 300 to each of the player terminals 100a to 100n and/or the database 400 via the data communication unit 310. In one embodiment, based on the manipulation information on movements of a basic identification range and an aim, a movement of a visual field of a player character, shootings, etc. that are received from each player terminal, the game progress control unit 320 may provide each of the player terminals 100a to 100n with information on suitable display variations.

The basic identification range selecting unit 330 may provide a selection of a basic identification range to provide automatic tracking of the present disclosure. In one embodiment, a basic identification range showing a player whether an enemy character becomes an automatic tracking object in the progress of the shooting game is displayed on the display of each of the player terminals 100a to 100n. The basic identification range may be a specified form of graphical user interface or other suitable types of graphic forms that are displayed on the display. For example, the basic identification range may include a boundary line of different suitable shapes including a rectangle, a circle, an ellipse, etc. and the enemy character may be set as the automatic tracking object when the enemy character enters the boundary line. In one embodiment, when the automatic tracking object is set within a given basic identification range, an aiming point displayed on the display can be moved along with the tracking object by automatically tracking movement of the tracking object, or a player may use a touch input means on the display or other suitable input means to move the aiming point displayed on the display to the automatic tracking object, such that a shooting action can be ready. Thus, by providing the basic identification range on the display of each of the player terminals 100a to 100n according to various embodiments, it is possible to track a shooting object with more ease on a player terminal equipped with a simple input means, such as a smartphone and provide a player with quick immersion and pleasure in a game.

In other embodiments, according to a setting or selection by players on the displays of the player terminals 100a to 100n, the respective players may be provided with the respective ranks and different basic identification ranges may be provided for the respective ranks For example, a junior player may be provided with a low rank and a wider basic identification range may be provided for the low rank. On the other hand, a senior player may be provided with a high rank and a narrower basic identification range may be provided for the high rank. Thus, by providing the different basic identification ranges according to the player's ranks, the junior player can be helped to adapt to and be immersed in game environments with more ease while the senior player can be provided with a higher level of shooting experience and a sense of immersion. Displaying the basic identification range according to one embodiment will be described later with reference to FIG. 5. In addition, the different basic identification ranges provided for the respective ranks according to one embodiment will be described later with reference to FIG. 7.

When a basic identification range is selected by the basic identification range selecting unit 330, the tracking object determining unit 340 may determine whether an enemy character capable of being automatically tracked exists in the selected basic identification range. If a plurality of enemy characters exists in the basic identification range, the tracking object determining unit 340 may determine an attack priority on each of the plurality of enemy characters. In one embodiment, for each of the enemy characters recognized within the basic identification range, the attack priority may be determined based on a level of damage capable of being caused by the player to the associated enemy character, a level of risk of the enemy character to the player, or other predetermined criteria. If a plurality of enemy characters are recognized within the basic identification range, those skilled in the art would be able to contemplate other various criteria on how the attack priority for each of the enemy characters can be determined. Based on the determined priority, the tracking object determining unit 340 may determine at least one tracking object to be automatically tracked.

The automatic tracking processing unit 350 may perform automatic tracking processing for the tracking object determined by the tracking object determining unit 340. According to one embodiment, an aiming point may be automatically moved to track a tracking object determined within a given basic identification range. The tracking object may be moved, for example according to a user manipulation for a player terminal to control enemy characters or according to an algorithm defined in the system, and locations of the aiming point can be automatically moved while the moving tracking object is tracked. In one embodiment, a spatial movement trajectory of the aiming point according to the automatic tracking can be visible to the player at all times, irrespective of whether the automatic tracking object is visible to the player. In one embodiment, the automatic tracking may be performed even if the tracking object hides behind a cover such as an obstacle (e.g., a wall or the like) on a virtual online shooting game space and the tracking object is invisible to the player. In other words, according to one embodiment, even if the player cannot see the tracking object hidden behind the wall, the automatic tracking can be performed and the aiming point can be positioned on the wall, behind which the tracking object is hidden, as long as the tracking object exists within the basic identification range. In addition, the aiming point moving within the basic identification range according to the automatic tracking may be displayed with different colors based on a level of precision of aiming at the tracking object according to the aiming point, i.e., a level of damage capable of being inflicted on the tracking object.

Figure 6A:
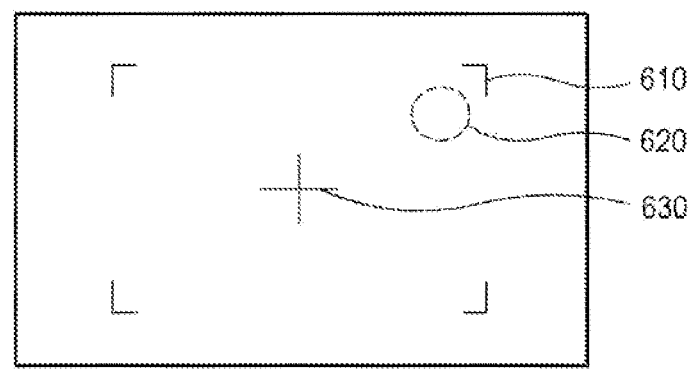
FIGS. 6A to 6D are diagrams showing a series of exemplary screens for explaining an online shooting game according to the present disclosure.
Figure 6B:
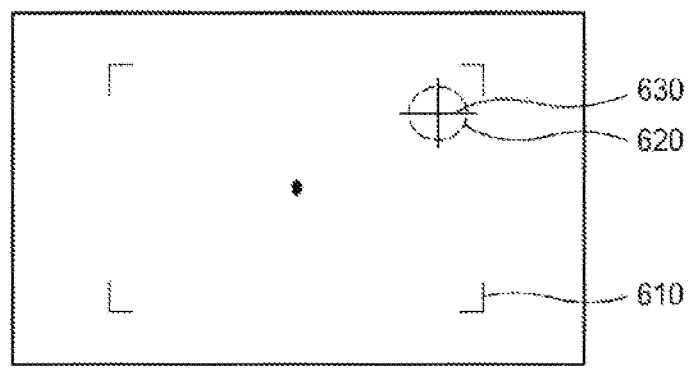
Figure 6C:
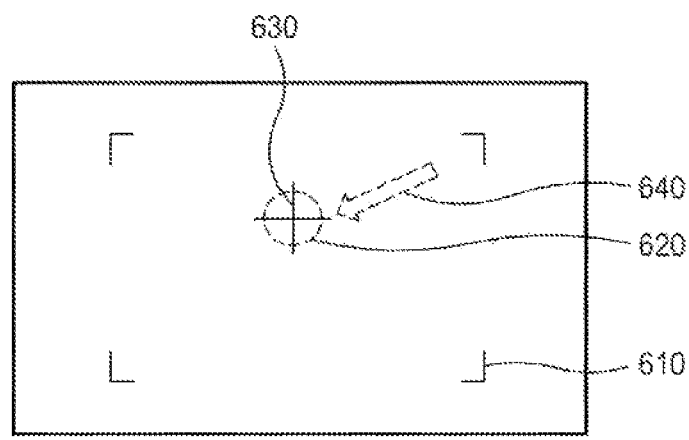
Figure 6D:
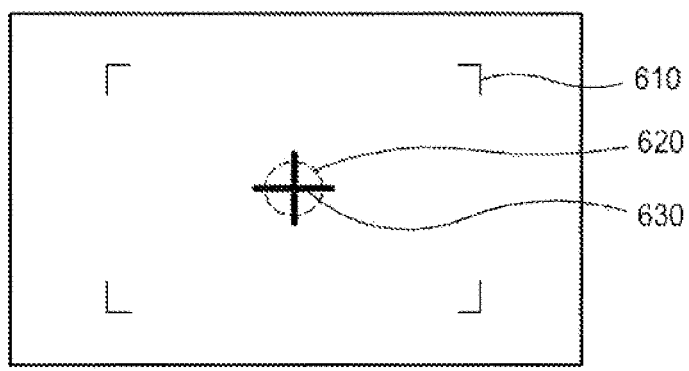

One example of the automatic tracking by the automatic tracking processing unit 350 will be understood with more ease by referring to FIGS. 6A to 6D. FIG. 6A shows a state where an enemy character 620 is recognized within a basic identification range 610 displayed on a display of a player terminal, however, the automatic tracking is not performed yet. FIG. 6B shows a state where the automatic tracking starts with the recognized enemy character 620 as an automatic tracking object and an aiming point 630 is located on or near the automatic tracking object 620. However, since the aiming point 630 is not yet located to correctly aim at the automatic tracking object 620, the aiming point 630 may be displayed in a first color (e.g., yellow) (although not specifically indicated). FIG. 6C shows a state where, when a relative location of the automatic tracking object 620 is varied within the basic identification range as the automatic tracking object 620 is moved in an arrow direction 640 or a player moves the basic identification range 610, a location of the aiming point 630 is moved according to such movement. At this time, although the aiming point 630 is being moved to track the tracking object 620, the aiming point 630 is in a state where a correct aiming is not yet made, i.e., a state where it cannot cause a highest level of damage to the tracking object 620 and thus the aiming point 630 may be still displayed in the first color (e.g., yellow). Further, FIG. 6D shows a state where the aiming point is aimed correctly at the tracking object 620 according to the automatic tracking so that the highest level of damage can be inflicted on the tracking object 620. In FIG. 6D, in order to indicate the correct aiming, the aiming point 630 may be displayed in a second color (e.g., red), other than the first color, which is previously displayed. Although it has been herein illustrated that the two colors are used to provide differential displays for precision of the aiming point 630, the present disclosure is not limited thereto. In other embodiments, it will be appreciated that the precision of the aiming point 630 can be differently displayed in other more colors or in other various ways. In addition, the aiming point 630 may take different shapes instead of the cross shape shown in FIG. 6.

Referring back to FIG. 2, the shooting determining and processing unit 360 may determine whether there is a shooting from a player. If it is determined that there is the shooting from the player, the shooting determining and processing unit 360 may determine a damage to be inflicted on the tracking object character, based on an attack range and firepower of a weapon of the player, a location relationship between the tracking object character and the player at the time when the shooting is made, etc.

The shooting determining and processing unit 360 may update information on the tracking object character based on the determined damage. For example, if it is determined based on the determined damage that the tracking object character is dead, the tracking object character may be processed to be dead.

According to one embodiment, if the shooting from the player causes damage to the tracking object character, the shooting determining and processing unit 360 transmit, to the player terminals 100*a* to 100*n*, information for allowing an indication informing that the tracking object character is damaged (for example, an indication that the body of the tracking object character is shaken or fell, etc.) to be displayed on the terminals. In one embodiment, separately from the update of the information on the tracking object character, loss of firepower of the player, who performed an attack input, etc. may be also calculated and reflected. According to one embodiment, the loss of firepower of the player, who performed the shooting may be determined based on the basic identification range. For example, if a basic identification range with a wider area is selected, it may be determined that a loss of firepower of the player according to the shooting in the basic identification range with the wider area is larger than that in a basic identification range with a narrower area.

Figure 3:
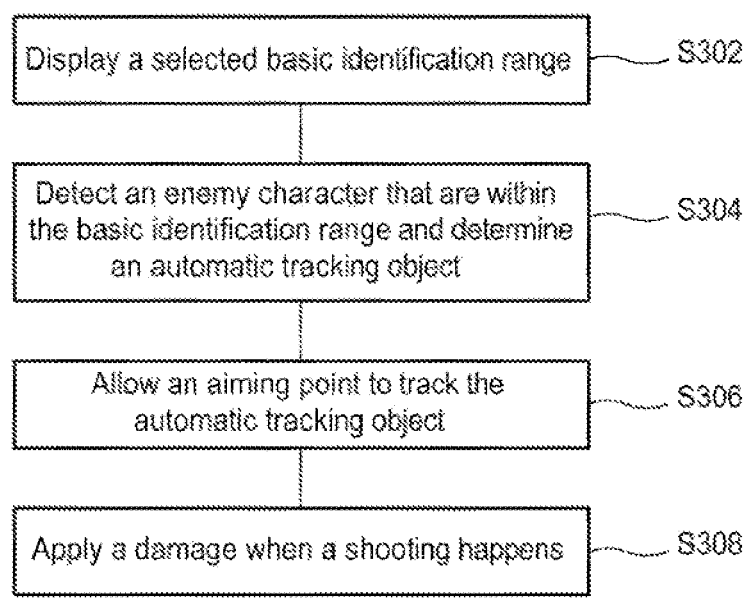
FIG. 3 is a flow chart for explaining a method of providing an online shooting game according to one embodiment of the present disclosure.

Although it has been illustrated in the above embodiments that the basic identification range selecting unit 330, the tracking object determining unit 340, the automatic tracking processing unit 350, and the shooting determining and processing unit 360 are installed and operated in the shooting game server 300, the present disclosure is not limited thereto. In some embodiments, at least one of the basic identification range selecting unit 330, the tracking object determining unit 340, the automatic tracking processing unit 350, and the shooting determining and processing unit 360 may be installed in other distributed shooting game servers, which are distributed, installed, and interconnected to each other via the communication network 200, or in at least one of the player terminals 100a to 100n. For example, if the basic identification range selecting unit 330, the tracking object determining unit 340, the automatic tracking processing unit 350, and the shooting determining and processing unit 360 are installed in the player terminal 100a, these units may determine the basic identification range and the automatic tracking object according to the basic identification range that are displayed on the display of the player terminal 100a and execute operations for the automatic tracking FIG. 3 is a flow chart for explaining a method of providing the online shooting game according to one embodiment of the present disclosure. The method of the exemplary flow chart illustrated in FIG. 3 may be implemented by a computer or a processor, such as the player terminals 100a to 100n or the server 300 configured to execute the online shooting game, or software such as a program executable by such a computer or processor. The method of the flow chart of FIG. 3 may include one or more operations or functions represented by one or more steps S302, S304, S306, and S308. Although the steps are shown as a series of blocks in FIG. 3, these blocks may be separated into additional blocks or combined into fewer blocks. In some embodiment, the blocks shown in FIG. 3 may be implemented by a parallel process, other than a sequential process, or by a combination thereof.

As shown, in Step S302, a selected basic identification range may be displayed on a player terminal. In one embodiment, a basic identification range showing a player whether an enemy character is taken as an automatic tracking object in the progress of the shooting game is displayed on the display of each of the player terminals 100a to 100n. As described above with reference to FIGS. 2 and 6A to 6D, the basic identification range may have a specified form of graphical user interface or other suitable types of graphic forms that are displayed on the display.

Then, in Step S304, enemy characters that are within a basic identification range of a current location may be detected and an automatic tracking object may be identified from the detected enemy characters. In one embodiment, as described above with reference to FIG. 2, when a basic identification range is selected by the basic identification range selecting unit 330, the tracking object determining unit 340 may determine whether an enemy character to be automatically tracked exists within the selected basic identification range. In addition, if it is determined that a plurality of enemy characters exists within the selected basic identification range, the tracking object determining unit 340 may determine a priority for attack on the plurality of enemy characters.

In Step S306 subsequent to Step S304, the automatic tracking may be initiated and an aiming point may track movement of the tracking object and be moved with the tracking object. In one embodiment, as described above with reference to FIG. 2, the automatic tracking processing unit 350 may perform an automatic tracking processing for the tracking object determined by the tracking object determining unit 340. According to one embodiment, movement of the aiming point may be automatically made to track the tracking object determined within a given basic identification range. In addition, irrespective of whether the automatic tracking object is visible to a player, a spatial movement trajectory of the aiming point according to the automatic tracking can be visible to the player at all times.

In Step S308, if there is a shooting by the player, damage to be inflicted on the tracking object may be determined and applied to the game. In one embodiment, as described above with reference to FIG. 2, the shooting determining and processing unit 360 may determine whether there is a shooting action from the player. If it is determined that there is a shooting from the player, the shooting determining and processing unit 360 may determine a damage to be inflicted on the tracking object character, based on an attack range and firepower of a weapon of the player, a location relationship between the tracking object character and the player at the time when there is a shooting, etc. In addition, the shooting determining and processing unit 360 may update information on the tracking object character based on the determined damage.

Figure 4:
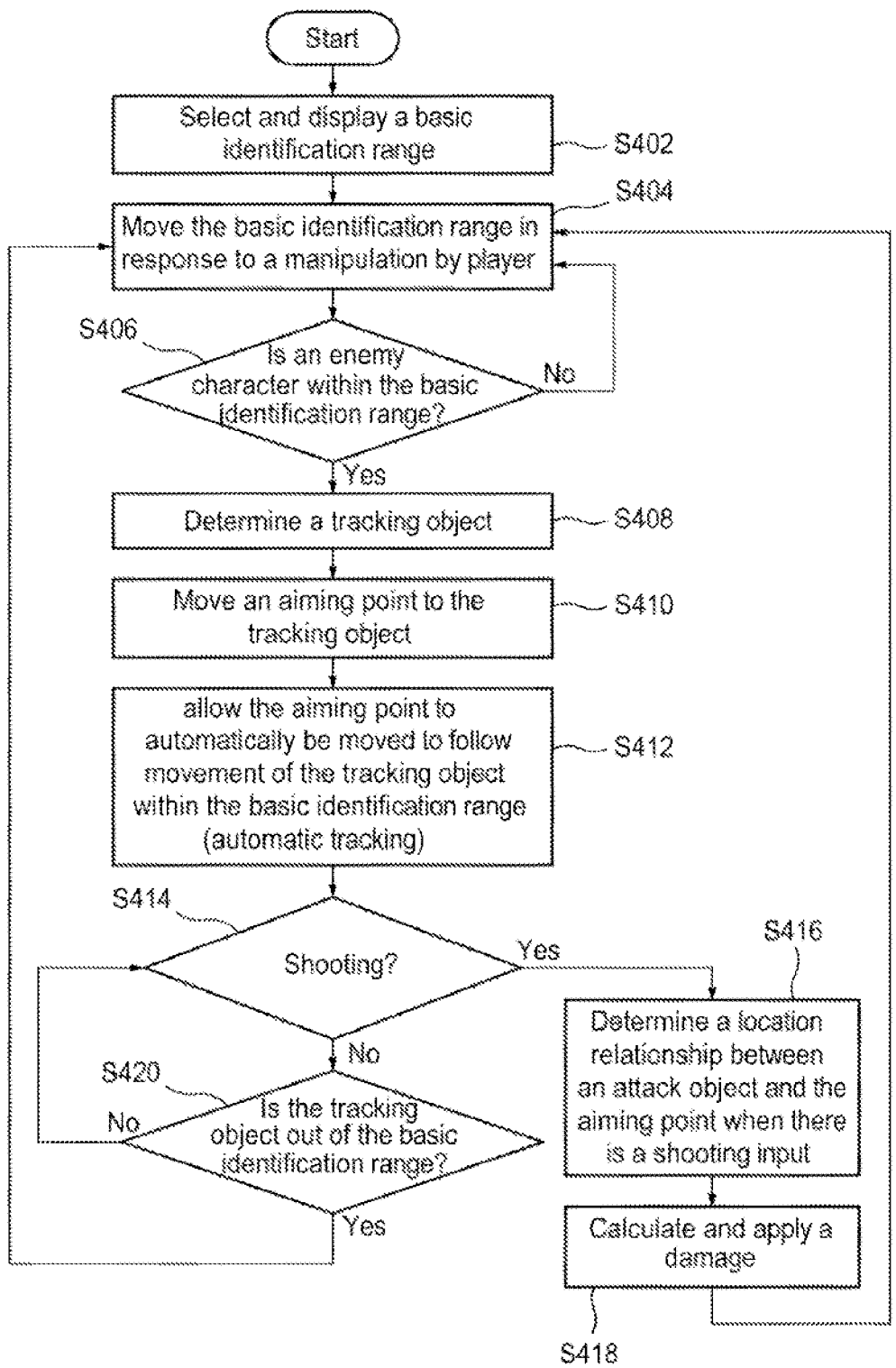
FIG. 4 is a flow chart for explaining a method of providing an online shooting game according to another embodiment of the present disclosure.

FIG. 4 is a flow chart for explaining a method of providing the online shooting game according to another embodiment of the present disclosure.

As shown, in Step S402, a basic identification range is determined according to a setting on each of a plurality of player terminals or a selection by a player and is displayed on the display of the player terminal. In one embodiment, the basic identification range selecting unit 330 may provide a selection of the basic identification range showing the player whether an enemy character becomes an automatic tracking object in the progress of the shooting game, and the selected basic identification range is displayed on the display of each of player terminals 100a to 100n. In addition, as described above, a plurality of basic identification ranges having different areas (i.e., different cover ranges) may be provided and one of the basic identification ranges may be selected or determined based on a skill level of the game of the player, etc. In one embodiment, according to a setting or selection by players on the display of each of the player terminals 100a to 100n, the respective players may be provided with different ranks and different basic identification ranges may be provided for the respective ranks For example, a junior player may be provided with a low rank and a wider basic identification range may be provided for the low rank. In addition, a senior player may be provided with a high rank and a narrow basic identification range may be provided for the high rank.

In Step S404, the basic identification range displayed on the display of each of the player terminals may be moved in response to a manipulation of the player under the progress of the game. Such movement of the basic identification range may be displayed on virtual online shooting game environments displayed on the player terminal. For example, if players move player terminals 100a to 100n in a horizontal or vertical direction, such movements may be detected by motion sensors installed within the player terminals 100a to 100n and the basic identification range may be displayed on the display under the virtual online shooting game environments while being moved in any directions including the horizontal or vertical directions. In other embodiments, in response to a selection of the player on a graphic user interface (e.g., a direction selection button) for selecting a direction that is displayed on the display of each of the player terminals 100a to 100n, the basic identification range may be moved and displayed in various directions including the horizontal and vertical directions within the virtual online shooting game environments displayed on the display.

While the basic identification range is being moved, it may be determined in Step S406 whether an enemy character exists within a basic identification range of a current location. In one embodiment, as described above with reference to FIG. 2, when a basic identification range is selected by the basic identification range selecting unit 330, the tracking object determining unit 340 may determine whether the enemy character to be automatically tracked exists within the selected basic identification range. It may be determined whether the enemy character exists within the basic identification range of the current location based on a predetermined algorithm.

Next, if it is determined in Step S406 that no enemy character exists within the basic identification range of the current location, the method proceeds to Step S404 where the basic identification range may continue to be moved in response to a manipulation by the player.

In one embodiment, it may be determined in Step S406 whether a plurality of enemy characters exists within the basic identification range of the current location.

If it is determined in Step S406 that one or more enemy characters exist within the basic identification range of the current location, among the enemy characters, an enemy character to be automatically tracked may be determined in Step S408. The enemy character to be automatically tracked may be determined based on a level of damage that a player can cause to each of the enemy characters, a level of risk of each of the enemy characters to the player, or other predetermined criteria, as described above. Those skilled in the art would be able to contemplate other various criteria, which can be used to determine the automatic tracking object.

When the enemy character to be automatically tracked is determined, in Step S410, an aiming point may be automatically moved over the determined automatic tracking object. In one embodiment, as described above with reference to FIG. 2, the automatic tracking processing unit 350 may automatically move the aiming point to follow the tracking object determined within the basic identification range by the tracking object determining unit 340.

Subsequently, in Step S412, automatic tracking may be performed, in which the aiming point is automatically moved based on movement of the automatic tracking object within the basic identification range, e.g., movement of the automatic tracking object according to a manipulation by a game counterpart or an algorithm defined in the system, to maintain an aim at the moving automatic tracked object. In one embodiment, as described above with reference to FIG. 2, the automatic tracking processing unit 350 may automatically move the aiming point to track the tracking object determined within the basic identification range by the tracking object determining unit 340. In one embodiment, a spatial movement trajectory of the aiming point according to the automatic tracking can be visible to the player at all times, irrespective of whether the automatic tracking object is visible to the player, as described above. Further, according to some embodiments, the automatic tracking may be performed even if the tracking object is hidden behind a cover such as an obstacle (e.g., a wall or the like) on a virtual online shooting game space and the tracking object is invisible to the player.

Subsequently, it is determined in Step S414 whether there is a shooting input from the player. In one embodiment, as described above with reference to FIG. 2, the shooting determining and processing unit 360 may determine whether there is a shooting input from the player. If it is determined that there is a shooting input from the player, the method proceeds to Step S416.

In Step S416, a location relationship between the aiming point and the automatic tracking object at the time when there is the shooting input from the player may be determined. Then, in Step S418, based on the location relationship between the aiming point and the automatic tracking object as determined in Step S416, an attack range and firepower of a weapon of the player, and other various criteria, a damage to be inflicted on the automatic tracking object may be calculated and reflected in the game progress. Although not shown in this figure, in one embodiment, loss of firepower of the player, who performed the shooting input, etc., may be also calculated and reflected, apart from calculating and reflecting the damage to be inflicted on the automatic tracking object. According to one embodiment, when there is the shooting input from the player, the shooting determining and processing unit 360 may determine a damage to be inflicted on the tracking object character based on an attack range and firepower of a weapon of the player, a location relationship between the tracking object character and the player at the time when there is the shooting input, etc. In addition, the shooting determining and processing unit 360 may update information on the tracking object character based on the determined damage. Then, the method returns to Step S404 where the basic identification range may continue to be moved in response to a manipulation by the player.

If it is determined in Step S414 that there is no shooting input from the player, the method may proceed to Step S420. It may be determined in Step S420 whether the automatic tracking object is out of the basic identification range. If it is determined that the automatic tracking object is not out of the basic identification range, the method may return to Step S414 where it may be again determined whether there is a shooting input from the player. On the other hand, if it is determined in Step S420 that the automatic tracking object is out of the basic identification range, the method may return to Step S404 where the basic identification range may continue to be moved in response to a manipulation by the player.

Figure 5:
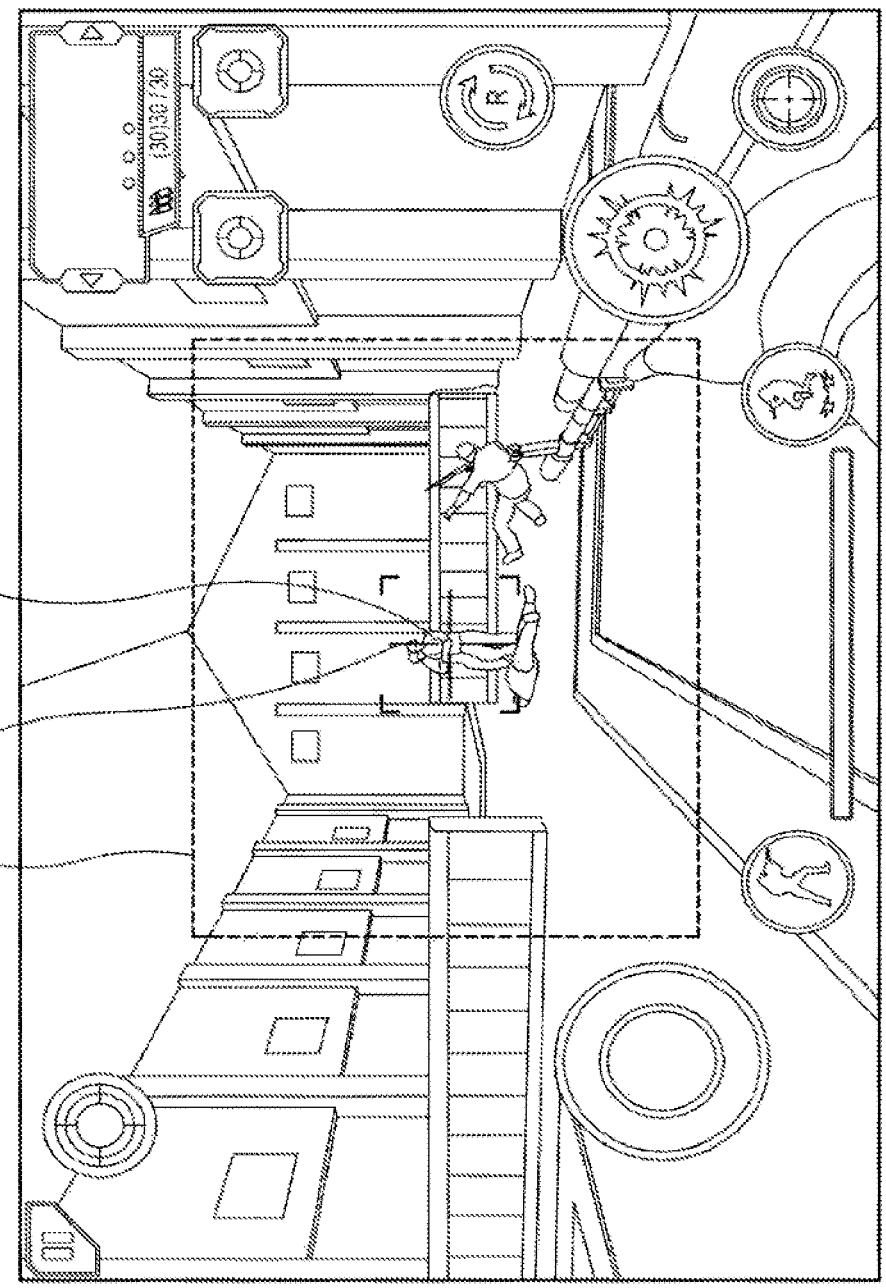
FIG. 5 is a diagram showing a virtual online shooting game space displayed on a player terminal when an online shooting game is executed, according to one embodiment of the present disclosure.

FIG. 5 shows a portion of a virtual online shooting game space displayed on the display of each of the player terminals 100a to 100n when the online shooting game is executed, according to one embodiment of the present disclosure. In one embodiment, a basic identification range indication 510 is displayed in a rectangular shape at the central portion of the virtual online shooting game space. Although FIG. 5 is shown with the basic identification range indication 510 having the rectangular shape, the present disclosure is not limited thereto. In other embodiments, the basic identification range indication may be displayed in various suitable shapes including a square, a circle, an ellipse, a triangle, and the like. In one embodiment, the basic identification range indication 510 may be moved within the virtual online shooting game according to a manipulation by the player. As shown in this figure, a cross hair-shaped aiming point 530 is displayed on an enemy character 520 within the rectangular basic identification range indication 510 having the rectangular shape. Although the aiming point 530 is shown to have the cross hair shape in this figure, the present disclosure is not limited thereto. In other embodiments, the aiming point may be displayed in various suitable shapes including a circle (e.g., a single circle or a doubled circle), a point, and the like.

Figure 7:
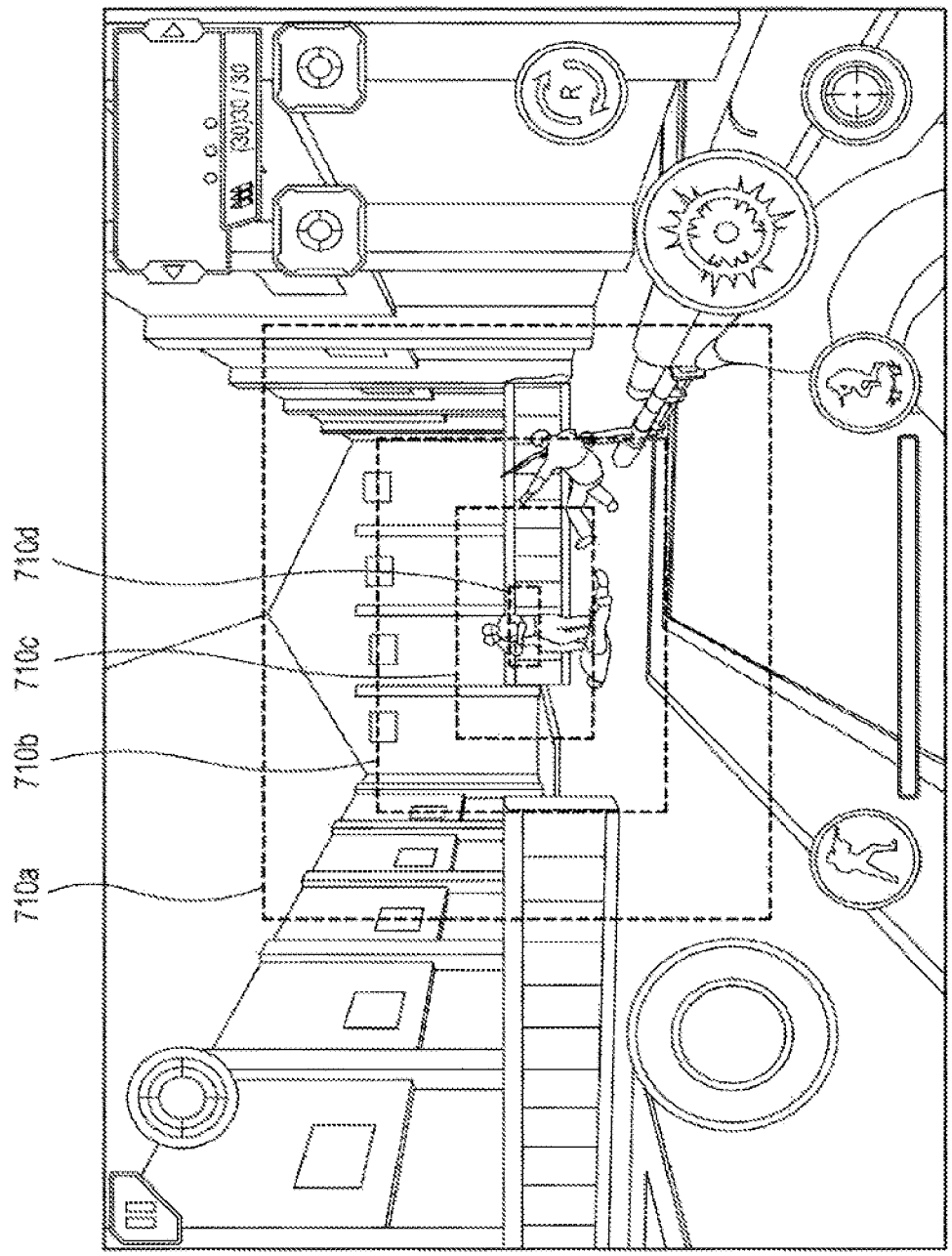
FIG. 7 is a diagram showing an exemplary screen for explaining an online shooting game according to the present disclosure.

FIG. 7 is a diagram showing an exemplary screen for explaining the online shooting game according to one embodiment of the present disclosure. In FIG. 7, different basic identification ranges 710a, 710b, 710c, and 710d provided for a plurality of ranks, respectively, are displayed on the virtual online shooting game space. In one embodiment, as described above, players participating in the online shooting game may be provided with different ranks, respectively, and basic identification ranges with different areas may be provided for the respective ranks In FIG. 7, four basic identification ranges 710a to 710d having different sequential areas are displayed in an overlapping manner. For example, a widest basic identification range, i.e., the outermost rectangular basic identification range 710a may be allocated to a junior player with a lowest level. In this case, the junior player can play the game with only a coarse manipulation of the widest basic identification range, without requiring an elaborative manipulation. Also, a narrowest basic identification range, i.e., the innermost rectangular basic identification range 710d may be allocated to a senior player with a highest level. In this case, since the basic identification range, in which the automatic tracking is performed, is narrow, there is a need for the senior player to perform a more elaborative manipulation within a relatively wide space. Although FIG. 7 is shown with only the four basic identification ranges 710a to 710d, the present disclosure is not limited thereto but may include fewer or more basic identification ranges depending on implementation of the present disclosure. In addition, although it is shown in this figure that the narrowest basic identification range 710d for the player of the highest level has a small but rectangular shape, the present disclosure is not limited thereto. In other embodiments, the area of the basic identification range for the player with the highest level may be set to zero (for example, a point having no internal area or a cross hair shape).

The above embodiments of the method of providing the online shooting game according to the present disclosure may be implemented with computer-executable codes or programs in a computer-readable recording medium. The computer-readable recording medium may include all types of recording media storing data readable by a computer system. For example, a ROM, a RAM, a CD-ROM, a magnetic tape, a hard disk, a floppy disk, a portable storage, a nonvolatile memory, an optical data storage, and so on may be utilized as the computer-readable recording medium, and the computer-readable recording medium may be also implemented in form of carrier wave such as transmission via Internet. In addition, the computer-readable recording medium may be distributed in computer systems interconnected by a computer communication network and codes stored in these computer-readable recording media may be read and executed in a distributing manner.

While the above embodiments have been described for understanding of the present disclosure, these embodiments have been presented by way of example only and it would be appreciated that various modifications and equivalent embodiments to the present disclosure will be also apparent to those skilled in the art from the present disclosure.

The invention claimed is:

1. A method of providing an online shooting game performed by a game server communicatively connected to a player terminal, the method comprising:
   selecting a basic identification range in an environment of the online shooting game displayed on the player terminal;
   determining whether at least one enemy character exists within the basic identification range;
   displaying, on the player terminal, an aiming point configured to automatically track the enemy character that is movable, the aiming point being displayed to move toward the enemy character even when the enemy character moves to be invisible within the basic identification range;
   receiving a shooting input from the player terminal;
   determining a damage to be inflicted on the enemy character based on the shooting input from the player terminal and the displayed basic identification range; and
   reflecting the determined damage in the online shooting game.

2. The method of claim 1, further comprising moving the basic identification range in response to a manipulation input from the player terminal.

3. The method of claim 1, wherein the basic identification range is a basic identification range selected from a plurality of basic identification ranges, which have different areas, respectively, according to a setting on the player terminal or a setting from the player terminal.

4. The method of claim 1, further comprising displaying a predetermined object on the player terminal,
   wherein the enemy character is not visible on the player terminal by the predetermined object.

5. The method of claim 1, further comprising displaying a movement trajectory of the aiming point on the player terminal.

6. The method of claim 1, wherein the automatically tracking the enemy character by the aiming point is not performed when the enemy character is not within the displayed basic identification range.

7. The method of claim 1, further comprising calculating loss of firepower to be applied to the player terminal based on the basic identification range and the received shooting input and reflecting the calculated loss of firepower in the online shooting game.

8. The method of claim 1, wherein displaying the aiming point comprises changing a displayed type of the aiming point according to a level of an expected damage capable of being inflicted on the enemy character by a shooting.

9. The method of claim 1, wherein the basic identification range include a boundary line of a specific shape, and
   wherein, when the enemy character enters the boundary line, the aiming point automatically tracks the enemy character.

10. A game server communicatively connected to a player terminal and configured to perform an online shooting game, comprising:
    circuitry configured to:
       select a basic identification range in an environment of the online shooting game displayed on the player terminal;
       determine whether at least one enemy character exists within the basic identification range;
       display, on the player terminal, an aiming point configured to automatically track the enemy character that is movable, the aiming point being displayed to move toward the enemy character even when the enemy character moves to be invisible within the basic identification range;
       receive a shooting input from the player terminal;
       determine a damage to be inflicted on the enemy character based on the shooting input from the player terminal and the displayed basic identification range; and
       reflect the determined damage in the online shooting game.

11. The game server of claim 10, wherein the circuitry is configured such that the damage is determined to be lower as the displayed basic identification range is larger.

12. The game server of claim 10, wherein the circuitry is configured such that the basic identification range is selected to be narrower as a level of the player using the player terminal is higher.

13. A non-transitory computer-readable recording medium storing a program that, when executed by a game server that is communicatively connected to a player terminal and is configured to perform an online shooting game, cause the game server to perform:

selecting a basic identification range in an environment of the online shooting game displayed on the player terminal;

determining whether at least one enemy character exists within the basic identification range;

displaying, on the player terminal, an aiming point configured to automatically track the enemy character that is movable, the aiming point being displayed to move toward the enemy character even when the enemy character moves to be invisible within the basic identification range;

receiving a shooting input from the player terminal;

determining a damage to be inflicted on the enemy character based on the shooting input from the player terminal and the displayed basic identification range; and reflecting the determined damage in the online shooting game.

14. The method of claim 1, wherein, in the determining the damage, the damage is determined to be lower as the displayed basic identification range is larger.

15. The method of claim 1, wherein the basic identification range is selected to be narrower as a level of the player using the player terminal is higher.

16. The non-transitory computer-readable recording medium of claim 13, wherein, in the determining the damage, the damage is determined to be lower as the displayed basic identification range is larger.

17. The non-transitory computer-readable recording medium of claim 13, wherein the basic identification range is selected to be narrower as a level of a player using the player terminal is higher.

* * * * *